United States Patent
Tsirkin et al.

(10) Patent No.: US 11,914,512 B2
(45) Date of Patent: Feb. 27, 2024

(54) WRITEBACK OVERHEAD REDUCTION FOR WORKLOADS

(71) Applicant: Red Hat, Inc., Raleigh, NC (US)

(72) Inventors: Michael Tsirkin, RaAnana (IL); Andrea Arcangeli, New York, NY (US); Giuseppe Scrivano, Milan (IT)

(73) Assignee: Red Hat, Inc., Raleigh, NC (US)

( * ) Notice: Subject to any disclaimer, the term of this patent is extended or adjusted under 35 U.S.C. 154(b) by 179 days.

(21) Appl. No.: 17/449,217

(22) Filed: Sep. 28, 2021

(65) Prior Publication Data
US 2023/0099170 A1    Mar. 30, 2023

(51) Int. Cl.
*G06F 12/0804* (2016.01)
*G06F 9/455* (2018.01)
*G06F 9/50* (2006.01)

(52) U.S. Cl.
CPC ...... *G06F 12/0804* (2013.01); *G06F 9/45558* (2013.01); *G06F 9/5016* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,892,937 A * | 4/1999 | Caccavale | H04L 67/01 714/E11.197 |
| 9,836,402 B1 * | 12/2017 | Riel | G06F 12/084 |
| 10,372,335 B2 | 8/2019 | Stabrawa et al. | |
| 11,016,798 B2 | 5/2021 | Gopalan | |
| 11,016,857 B2 | 5/2021 | Bishop et al. | |
| 2014/0047183 A1 * | 2/2014 | Chawla | G06F 12/084 711/119 |
| 2016/0314134 A1 * | 10/2016 | Murashkin | H04L 69/40 |
| 2017/0068618 A1 * | 3/2017 | Akiyama | G06F 12/0871 |
| 2019/0034346 A1 * | 1/2019 | Lv | G06F 12/0888 |
| 2021/0165675 A1 | 6/2021 | Wang et al. | |

OTHER PUBLICATIONS

Andrea Righi. "memcg: per cgroup dirty limit (v3)." Mar. 2010. https://lwn.net/Articles/376757/.*
Greg Thelen. "memcg: per cgroup dirty page limiting." Aug. 2011. https://lwn.net/Articles/455341/.*
(Continued)

*Primary Examiner* — Nathan Sadler

(57) ABSTRACT

An example system includes a memory, a processor in communication with the memory, and a supervisor. The supervisor is configured to allocate a memory space in the memory to a workload executing on the processor. The supervisor is configured to store data written by the workload as dirty memory in the memory space at least until the data is written back to a data storage. Based on a type of the workload being a first type, the supervisor is configured to trigger write back of at least a portion of the dirty memory into the data storage in response to the dirty memory exceeding a threshold level. Based on the type of the workload being a second type, the supervisor is configured to delay write back of the dirty memory into the data storage in response to the dirty memory exceeding the threshold level.

18 Claims, 6 Drawing Sheets

(56) References Cited

OTHER PUBLICATIONS

Bob Plankers. "Better Linux Disk Caching & Performance with vm.dirty_ratio & vm.dirty_background_ratio." Dec. 2013. https://lonesysadmin.net/2013/12/22/better-linux-disk-caching-performance-vm-dirty_ratio/.*
Rancher Admin. "An Introduction to Containers." May 2019. https://www.suse.com/c/rancher_blog/an-introduction-to-containers/.*
Cai, et al., Fast Nonblocking Persistence for Concurrent Data Structures, Department of Computer Science, University of Rochester, 2021.
Kelly, Persistent Memory Programming on Conventional Hardware, 2019.
Zhang, Persistent State Machines for Recoverable In-memory Storage Systems with NVRam, UC Berkeley; Microsoft Research/University of Washington, 2020.

* cited by examiner

| | | |
|---|---|---|
| Page Entry 202A | 210A PFN | 220A Clean, Unused | 230A Address of Unallocated Memory |
| Page Entry 202B | 210B PFN | 220B Clean, Used | 230B Address of Memory Allocated to WL 'A' |
| Page Entry 202C | 210C PFN | 220C Dirty, Used | 230C Address of Memory Allocated to WL 'A' |
| Page Entry 202D | 210D PFN | 220D Clean, Unused | 230D Address of Memory Allocated to WL 'A' |
| Page Entry 202E | 210E PFN | 220E Dirty, Used | 230E Address of Memory Allocated to WL 'B' |

FIG. 2

WRITEBACK OVERHEAD REDUCTION FOR WORKLOADS

BACKGROUND

Computer systems may run workloads (e.g., applications or services). In a cloud environment, workloads may be provided via a server or cloud. The workloads may be developed and deployed as a single unit or as multiple units, such as a collection of microservices. Additionally, a workload may be deployed as a container or as a pod that includes a group of containers configured to run on a physical or virtual machine. For example, a pod or container may encapsulate a lightweight runtime environment for an application or a microservice. Each workload (e.g., tenant) may co-exist with other tenants in a computer system (or cloud environment). Specifically, a computer system (or a cloud infrastructure) may represent a multi-tenant processing infrastructure where resources are shared to increase system-wide performance thereby providing enhanced results to users of the processing infrastructure. One such shared resource is memory.

Traditionally, a kernel manages memory resources of a computer system to reduce latency and optimize throughput associated with data read and write operations. For example, when a workload running on the computer system attempts to write data to a data store (e.g., disk), the kernel may temporarily store the data in a cache or other local memory (e.g., random access memory (RAM)) as dirty memory. By doing so, the kernel may reduce (or postpone) overhead (e.g., number of input/output operations per second (IOPS)) associated with writing the data to the data store and/or reading the data from the data store in the future. The kernel may monitor memory usage in the computer system to decide when to synchronize or flush the dirty memory into the data store. For example, the kernel may trigger flushing the dirty memory when overall dirty memory usage in the computer system reaches a certain level.

SUMMARY

The present disclosure provides new and innovative systems and methods for reducing writeback overhead associated with a workload. In an example, a system includes a memory, a processor in communication with the memory, and a supervisor. The supervisor is configured to allocate a memory space in the memory to a workload executing on the processor. The supervisor is also configured to store, as dirty memory in the memory space allocated to the workload, data written by the workload at least until the data is written back into a data storage. The supervisor is also configured to trigger, based on a type of the workload being a first type, write back of at least a portion of the dirty memory into the data storage in response to the dirty memory exceeding a threshold level. The supervisor is also configured to delay, based on the type of the workload being a second type, write back of the dirty memory into the data storage in response to the dirty memory exceeding the threshold level.

In an example, a method involves allocating memory space in a memory to a workload executing on a processor. The processor is in communication with the memory. The method also involves storing, as dirty memory in the memory space allocated to the workload, data processed by the workload at least until the data is written back to a data storage. The method also involves writing out, based on a type of the workload being a first type, at least a portion of the dirty memory to the data storage in response to the dirty memory exceeding a threshold level. The method also involves delaying, based on the type of the workload being a second type, write out of the dirty memory to the data storage in response to the dirty memory exceeding the threshold level.

In an example, a non-transitory machine readable medium stores instructions that, when executed by at least one processor of a computer system, cause the computer system to allocate memory space in a memory to a workload executing on a processor. The processor is in communication with the memory. The instructions also cause the computer system to store, as dirty memory pages in the memory space allocated to the workload, data from the workload at least until the data is written out to a data storage. The instructions also cause the computer system to write, based on a type of the workload being a first type, at least a portion of the dirty memory pages to the data storage in response to the dirty memory pages exceeding a threshold level. The instructions also cause the computer system to delay, based on the type of the workload being a second type, writing the dirty memory pages to the data storage in response to the dirty memory pages exceeding the threshold level.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2 illustrates a block diagram of an example page table, according to an example embodiment.

DETAILED DESCRIPTION OF EXAMPLE EMBODIMENTS

Figure 1:
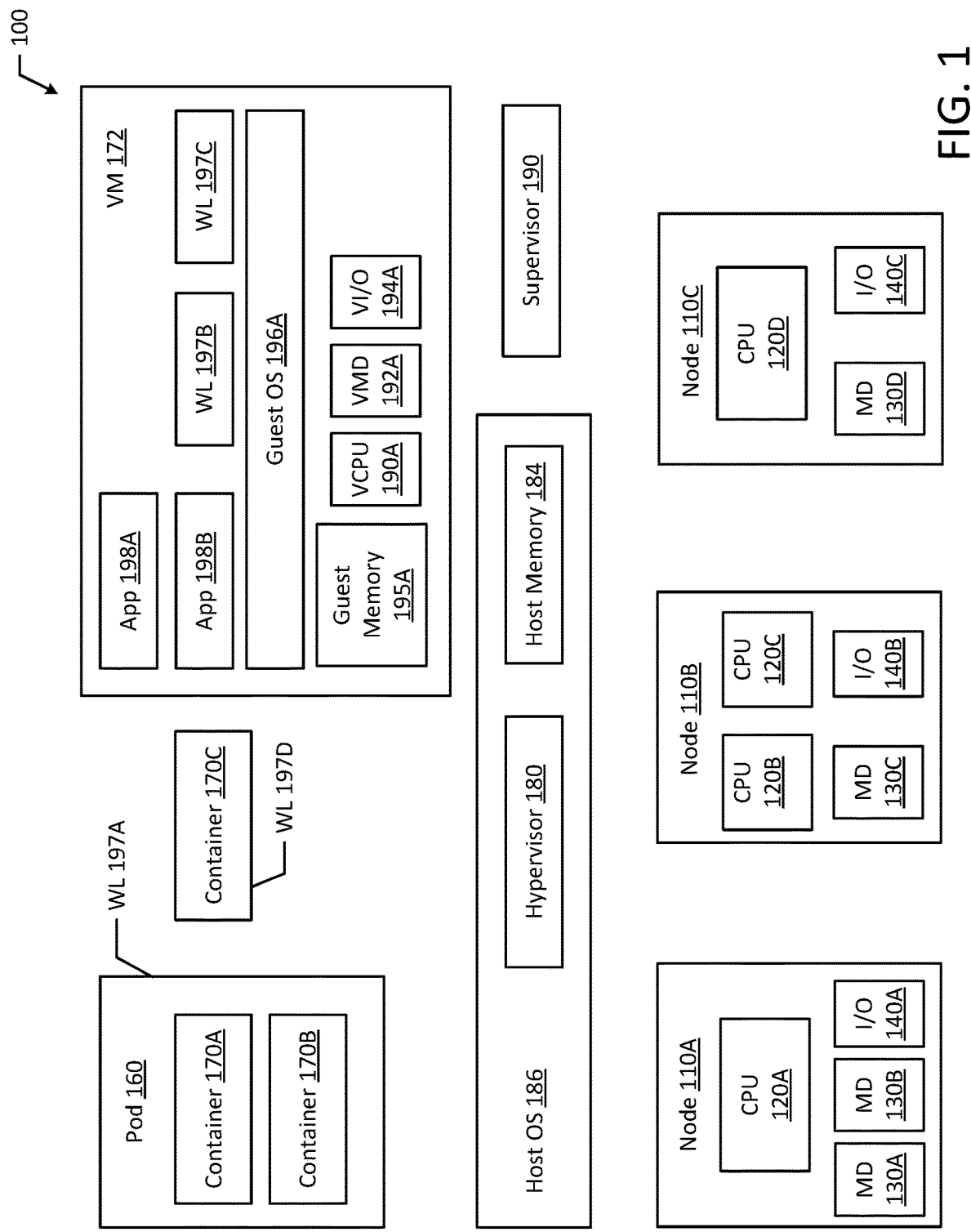
FIG. 1 illustrates a block diagram of an example computer system, according to an example embodiment.

Techniques are disclosed for reducing latency and data write-back overhead associated with execution of a workload. Operating system (OS) kernels generally prefer to save data, as dirty memory, in non-persistent memory (e.g., RAM) because accessing non-persistent memory is usually much faster than accessing persistent memory (e.g., disk or other data storage). To mitigate the risk of data loss (e.g., in the event of a system crash) and/or to free up memory space, the kernel may flush or synchronize the dirty memory into the persistent memory periodically or in response to a triggering event. For example, the kernel (e.g., a supervisor of a regular OS or a hypervisor of a virtual machine) may monitor a ratio of overall dirty memory usage relative to all the memory of the system. If the ratio exceeds a threshold ratio, the kernel may trigger flushing at least a portion of the dirty memory from the non-persistent memory to the persistent memory. The threshold ratio may be a default threshold ratio (e.g., 10%) or a user-supplied threshold ratio (e.g., a user setting of an OS or a guest OS).

However, in some scenarios, enforcing such a system-wide threshold may add latency to workloads (e.g., processes, programs, applications, containers, pods, and/or virtual machines) that are sharing resources on a host system. For example, a host OS may be configured to allocate only a portion (e.g., 4 GB of RAM) of a memory resource (e.g., 16 GB of RAM) of the host system to a particular workload (e.g., container, pod, application, service, etc.). In this example, enforcing a threshold dirty memory ratio on the workload may result in more frequent data write/read events than when that same threshold ratio is enforced on the overall dirty memory usage of the underlying host system. For instance, a static threshold ratio (e.g., 10%) may correspond to a lower number of bytes (e.g., 400 MB of 4 GB RAM allocated to the workload) than a number of bytes (e.g., 1.6 GB of 16 GB RAM in the host OS) corresponding to enforcement of that same threshold ratio on overall memory usage in the host system. The lower effective threshold (e.g., 400 MB vs. 1.6 GB) enforced on the workload could thus be triggered more frequently, even if the underlying host system still has plenty of available non-persistent memory.

High write-back overhead (e.g., high number of IOPS) associated with such frequent dirty memory flush events could add latency to regular processes of the workload (e.g., processor threads of the workload delayed while waiting for a processor to flush the dirty memory), and/or other workloads running on the host system (e.g., sharing the same processor capacity and/or I/O capacity used to flush the dirty memory, etc.).

Furthermore, in virtual environments, the demand on persistent memory resources such as server data storage and other storage resources (e.g., virtual memory or swap memory on a disk, etc.) can rise sharply due to recurring events that have high I/O demand, such as boot, login, logoff, shutdown, application patches, etc., which are commonly referred to as I/O storms. Additionally, random workloads can spike throughout the day with no reliable way of knowing where they will occur, or what set of resources they will require. Periods with I/O intensive tasks such as boot storms, patching, and antivirus place even more demand on the underlying infrastructure, which may result in reducing system performance. To that end, frequent dirty memory flush events may also contribute to causing such I/O storms to repeatedly fetch data from storage on access.

To reduce latency associated with write-back overhead, some kernels allow a user to adjust the threshold dirty memory ratio enforced by a host OS. However, increasing the threshold dirty memory ratio or level at a high system-level can also result in higher risks such as data loss (e.g., if the host system crashes before the dirty memory is flushed), out-of-memory faults (e.g., if the host system runs out of non-persistent memory), and/or data inconsistency (e.g., if an older version of the data stored in the persistent storage is accessed by another process or workload before a newer version of the data in the dirty memory of the workload is synchronized with the older version of the data in the persistent memory).

Additionally, some types of workloads are more sensitive to such risks than others. For instance, some workloads may be persistent in nature while other workloads may be non-persistent in nature.

By way of example, a first workload that is of a persistent type may be configured to process data (e.g., perform calculations for a simulation, collect sensor measurements, interact with user, etc.) or perform any other type of activity that is relatively more sensitive to data loss and/or data consistency risks. For instance, in the event of a system crash or other fault, the data that was in the dirty memory of the first workload might be difficult to re-generate by simply launching another instance of the first workload (e.g., data generated based on user inputs that are no longer available, etc.). Alternatively or additionally, a user might prefer to prioritize minimizing data loss or data consistency risks when running the first workload to avoid repeating the same computations in the event of a failure or system crash.

On the other hand, a second example workload that is of a non-persistent type may be configured to perform functions that are less persistent in nature (e.g., initialize or build an application, install software or application patch, run a setup script, perform an antivirus scan, etc.) or that are less sensitive to data loss and/or data consistency risks. For instance, the second workload may be configured to terminate after performing some type of non-persistent or transient operation. Additionally or alternatively, data generated by the second workload might be relatively easy to regenerate in the event of a failure (e.g., re-running a setup script, etc.). Alternatively or additionally, in the event of a failure, a user might prefer discarding corrupt data generated by the second workload anyway and relaunch the second workload over attempting to fix the corrupt data (e.g., files installed during an incomplete installation of an application, etc.).

More generally, a particular globally-enforced dirty memory threshold ratio suitable for optimally running one or more workloads deployed on a host system might be less suitable for one or more other workloads running on the same host system.

Accordingly, example systems and methods are disclosed herein that enable selectively enforcing a threshold that triggers write-back of dirty memory for one or more workloads. To facilitate this, an example system or method could associate each workload with a type. For example, the system (or a workload administrator) can assign a first type (e.g., persistent) to workloads or containers which are generally more sensitive to data loss/inconsistency risks (e.g., an application that receives user inputs and generates an output document that is then saved to disk, or any other type of container that is persistent in nature). Additionally, the system may assign a second type (e.g., non-persistent) to other workloads that are generally less sensitive to data loss/inconsistency risks (e.g., a build container, a setup script, an initialization container, etc.).

The example system or method may then monitor dirty memory usage of each workload. If dirty memory usage by a workload reaches a threshold ratio (e.g., 10%) and that workload is of the first type (persistent), a supervisor or hypervisor of the system may responsively trigger writing back (at least part of) the dirty memory of the workload into the data storage. But if the type of the workload is the second type (e.g., non-persistent), then the supervisor or hypervisor of the system may instead continue to delay writing back the dirty memory even though the threshold ratio (e.g., 10%) was triggered.

By way of example, a computing system herein may be configured to allow a user or administrator to create or deploy a workload in a special type of pod or container (e.g., non-persistent container, build container, initialization container, etc.), which may not guarantee a same level of data consistency as other types of containers but which can run with relatively less write-back overhead (e.g., by relaxing or disabling enforcement of dirty memory usage thresholds for that special type of container, etc.).

In some examples, the system may simply disable enforcing the threshold dirty memory ratio for non-persistent workloads (i.e., the second type of workloads) while continuing to enforce it for persistent workloads (i.e., the first type of workloads). Alternatively or additionally, in some examples, the system may enforce a higher threshold (e.g., 50% or 100%) for triggering write-backs in non-persistent workloads instead of the lower threshold (e.g., 10%) used to trigger write-backs in persistent workloads.

More generally, various example systems and methods herein may advantageously enable a user or workload administrator or kernel to flexibly control whether a kernel or hypervisor should prioritize data loss/data consistency risk mitigation by frequently flushing dirty memory of a workload (e.g., if it is a first type of workload), or whether the kernel or hypervisor should instead prioritize minimizing write-back overhead by postponing or disabling the flushing of the dirty memory of the workload (e.g., if it is a second type of workload).

FIG. 1 depicts a high-level component diagram of an example computing system 100 in accordance with one or more aspects of the present disclosure. The computing system 100 may include an operating system (e.g., host OS 186), one or more trusted execution environments (TEEs) (e.g., virtual machine (VM) 172), one or more workloads (WLs) 197A-D (collectively referred to herein as WLs 197), and nodes (e.g., nodes 110A-C). The system 100 may include a hypervisor 180, a supervisor 190 (e.g., kernel), or a combination of both.

As used herein, a workload 197 may be an application (e.g., WL 197B-C may be applications similar to applications 198A-B), a container (e.g., WL 197D may be a container 170C), or a pod 160 of containers (e.g., pod 160 with containers 170A-B). The workloads 197A-D (e.g., programs, applications, services, microservices, containers, or pods) may be added to the computing system 100 to provide additional application functionality or to scale certain services or aspects of an application. For example, as processes are scaled to meet increased demand from clients, workloads 197A-D (e.g., containers or pods) may be replicated and deployed on various nodes and/or node clusters to handle the increased load. In an example, a workload 197 may be an execution environment, such as a server or virtual server, and/or a stand-alone execution environment, similar to that of a virtual machine.

The computer system 100 may include one or more nodes 110A-C. The nodes 110A-C may be cluster nodes with one or more machines running in a cluster. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Workloads 197 may be provisioned on the same host or node (e.g., node 110A) or different nodes. For example, WL 197A and WL 197B may both be provisioned on node 110A. Alternatively, WL 197A may be provisioned on node 110A while WL 197B is provisioned on node 110B. In some examples, one or more of nodes 110A-C may be non-uniform memory access ("NUMA") nodes.

Containers 170A-C may execute applications, services, or microservices. As discussed above, a container 170 may be a workload 197 (e.g., container 170C is a WL 197D). In an example, the containers 170A-C may each run a process or service. In an example, one or more of the containers 170A-C may be an execution environment. For example, one or more of the containers 170A-C may be a server, such as a virtual server. It should be appreciated that the containers 170A-C may be stand-alone execution environments, similar to that of a virtual machine.

Virtual machine (VM) 172 may include a guest OS(s), guest memory or virtual machine memory, a virtual CPU (VCPU), virtual memory devices (VIVID), and virtual input/output devices (VI/O). For example, virtual machine 172 may include guest OS 196A, guest memory or virtual machine memory 195A, a virtual CPU(s) 190A, a virtual memory device(s) 192A, and a virtual input/output device(s) 194A. Virtual machine memory or guest memory 195A may include one or more memory pages. In an example, VM 172 may execute the guest OS 196A and run applications 198A-B or WLs 197B-C, which may utilize the underlying VCPU 190A, VIVID 192A, and VI/O device 194A. In an example, a device may be implemented as a virtual machine (e.g., virtual machine 172).

In an example, the computing system 100 may include a hypervisor 180 and host memory 184. Hypervisor 180 may manage host memory 184 for the host operating system 196A as well as memory allocated to the virtual machine 172 and/or guest operating system 196A, such as guest memory or virtual machine memory 195A provided to guest OS 196. In an example, host memory 184 and virtual machine memory 195A may be divided into a plurality of memory pages that are managed by the hypervisor 180. Virtual machine memory 195A allocated to the guest OS 196A may be mapped from host memory 184 such that when a guest application 198A-B and/or a WL 197B-C uses or accesses a memory page of virtual machine memory 195A, the guest application 198A-B and/or the WL 197B-C is actually using or accessing host memory 184.

In an example, the computing system 100 may include a supervisor 190 that coordinates and controls the operation of applications 198A-B and/or workloads 197A-D. In an example, the supervisor 190 may be a kernel or may be part of a kernel. In an example, the supervisor 190 may be the hypervisor 180.

The supervisor 190 or the hypervisor 180 or the OS 186 or the OS 196A may be configured to allocate a respective memory space for each WL 197A-D running on the computer system 100. For example, the supervisor 190 or the hypervisor 180 may allocate one or more memory pages of the host memory 184 to WL 197B and one or more different memory pages of the host memory 184 to the WL 197C.

Additionally, the hypervisor 180 or the supervisor 190 may be configured to store and track usage of dirty memory for each WL 197 running on the computing system 100. For example, if a WL 197 needs to write data to a persistent memory (e.g., a disk, data storage, hard disk drive (HDD), solid state drive (SDD), server storage or other type of storage device (e.g., a MD 130 of a different node 110 than the node on which the WL is deployed, an I/O 140 that includes a storage device such as a flash drive or disk drive, etc.), the hypervisor 180 or the supervisor 190 may temporarily store the data to a non-persistent memory (e.g., RAM), and may update page table entries in the memory space allocated to the WL to indicate that they are dirty memory pages. The supervisor 190 or the hypervisor 180 may also write-protect the dirty memory pages at least until they are transferred (e.g., written back, written out, etc.) to the persistent memory.

Additionally, the hypervisor 180 or the supervisor 190 may be configured to determine a workload type assigned to each WL 197.

In an example, a given type of a given workload 197 may be assigned to the workload by a user of the system 100. For example, an administrator of a VM 172 or a WL 197 or a container 170 may submit a configuration parameter, such as a workload type (e.g., persistent, non-persistent, etc.) selected from a list of possible types, or other parameter describing or classifying the container or workload (e.g., build container, initialization container, etc.). In this example, the supervisor 190 or the hypervisor 180 can obtain the user supplied information from metadata associated with the container 170 or the workload 197.

In another example, the given type of the given workload may be assigned by the supervisor 190 or the hypervisor 180. For example, the supervisor 190 or the hypervisor 180 may assign a default type (e.g., persistent, etc.) to containers or workloads that do not have metadata indicating a user selection of the type. Alternatively or additionally, the supervisor 190 or the hypervisor 180 may determine the type of a WL 197 or a container 170 by examining configuration parameters of the WL 197 or container 170. For example, the supervisor 190 or the hypervisor 180 may assign a first workload type (e.g., non-persistent) to container 170A based on a configuration parameter of the pod 160 indicating that the container 170A is an initialization or build container (e.g., a container that runs a setup script, or a container that must terminate before running container 170B, etc.); and the supervisor 190 or the hypervisor 180 may assign a second workload type (e.g., persistent) to the container 170B based on a configuration parameter of the pod 160 indicating that the container 170B is a runtime container (e.g., a container that interacts with a user, a container configured to continue running until a termination request is received from a user, etc.).

Additionally, the hypervisor 180 or the supervisor 190 may be configured to monitor dirty memory usage of each WL 197 running on the computing system 100. If dirty memory usage in a particular memory space allocated to a particular WL 197 exceeds a threshold, then the hypervisor 180 or the supervisor 190 may be configured to trigger writing out at least a portion of the dirty memory of the particular WL if a type of the particular WL is a first type (e.g., persistent) or continue to delay writing out the dirty memory of the particular WL if the type of the particular WL is a second type (e.g., non-persistent). In some examples, the threshold may be a particular amount of dirty memory (e.g., 1 GB, 2 GB, etc.) or a ratio of an amount of the dirty memory relative to a total amount of the memory space allocated to the workload.

Thus, in some examples, the hypervisor 180 or the supervisor 190 may allow containers or workloads that are of a non-persistent type to continue writing dirty memory in their allocated memory space even after exceeding a standard dirty memory threshold enforced on other workloads that are of a persistent type.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

FIG. 2 illustrates a block diagram of a page table 200 according to an example embodiment of the present disclosure. The page table 200 may be a host page table. In general, the OS 186 or the hypervisor 180 or the supervisor 190 may manage memory usage of the applications 198A-B and/or the WLs 197A-D. The physical memory allocated by the OS 186 or the hypervisor 180 or the supervisor 190 to each of the applications 198A-B and/or the WLs 197A-D may be divided into memory pages, which are identified with a unique number (e.g., Page Frame Number (PFN) 210A-E).

Page table 200 is a data structure that may be used to store a mapping of memory addresses of the host memory 184 to memory addresses of physical memory allocated to each WL 197, virtual machine (e.g., VM 172), and/or other application (e.g., applications 198A-B) running on the computer system 100. Accordingly, address translation may be handled using the page table(s) 200. In an example, the page table(s) 200 stores a mapping of virtual address to physical addresses.

The page table(s) 200 comprises page entries 202A-E that map PFN 210A-E (e.g., addresses of virtual memory such as VM 195A or other virtual memory in an application space) with physical memory addresses 230A-E. Page table(s) 200 may be used together with any paging data structure to support translation between addresses (e.g., 32-bit linear address space using a two-level hierarchical paging structure, Physical Address Extension mode, INTEL Extended Memory 64 Technology mode, etc.)

In an example, page table(s) 200 may include protection or status identifiers 220A-E. A status identifier 220A-E may indicate a status of a page corresponding to a page entry 202A-E of the page table(s) 200. For example, a status identifier 220A-E may be used to define that a given page is dirty (e.g., stores data that has not yet been written out to disk), clean, used (e.g., accessed), unused, etc.

In the illustrated example of FIG. 2, a memory page corresponding to page entry 202A having PFN 210A is an unallocated memory page (e.g., a memory page that is available for allocation to a new or existing workload). As such, the status identifier 220A of that page indicates that it is clean (e.g., does not store dirty memory written by any workload) and unused (e.g., not yet accessed by a user space or workload).

Further, in the illustrated example of FIG. 2, memory pages of page entries 202B-D are allocated to a first workload (labeled as WL 'A' in FIG. 2). For example, the supervisor 190 or the hypervisor 180 may allocate these memory pages (having virtual addresses of PFN 210B-D corresponding to physical addresses 230B-230D) to the first WL 'A'. In this example, the supervisor 190 or the hypervisor 180 may temporary store dirty memory written by WL 'A' in one or more of the memory pages allocated to WL 'A' (e.g., the memory page of PFN 210C) and may mark the dirty memory pages of the WL 'A' as dirty memory pages using the corresponding status identifier (e.g., identifier 220C). In an example, the supervisor 190 or the hypervisor 180 may keep the "Dirty" identifier 220C to ensure that the memory page of PFN 210C is not over-written at least until the dirty memory stored in the memory address 230C is transferred to the persistent storage (e.g., disk). The supervisor 190 or the hypervisor 180 may then update status identifiers of memory pages that have been flushed out to disk as "Clean" instead of "Dirty," even if these memory pages are still being used to hold that same data. For instance, as shown, the memory page of PFN 210B is allocated to and used by WL 'A' but marked as clean. In this instance, the supervisor 190 or the hypervisor 180 may allow replacing (e.g., re-using) the clean memory page at PFN 210B even though it was used or accessed or may continue to keep the data in the memory address 230B until that space is needed.

The page table(s) 200 may include additional or different components than shown in FIG. 2, such as additional page entries, statistics information, background information, write-protection information, etc.

Figure 3:
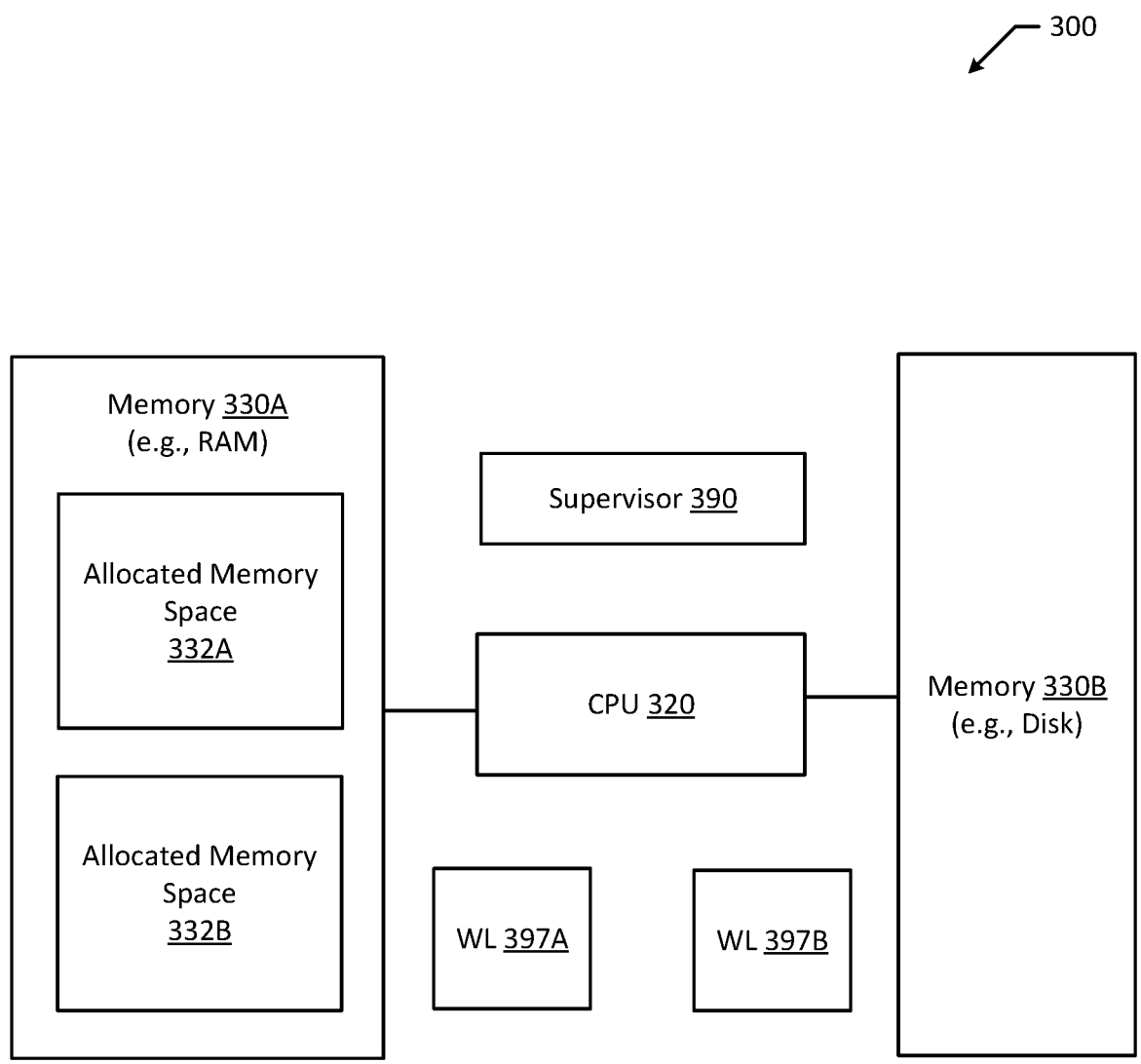
FIG. 3 illustrates a block diagram of an example computer system that includes different types of memory, according to an example embodiment.

FIG. 3 is a block diagram of an example system 300 that includes different types of memory 330A-B, according to an example embodiment. The system 300 may be a computing system similar to system 100 of FIG. 1. For example, the system 300 may include one or more CPUs 320, a supervisor 390, and one or more workloads 397A-B, which are similar, respectively, to the CPUs 120, the supervisor 190, and the workloads 197.

The WLs 397A-B may be deployed to run on the system 300 and may be executing on the one or more CPUs 320. Further, the supervisor 390 may be configured to allocate a first memory space 332A in the memory 330 to the WL 397A and a second memory space 332B to the WL 397B, in line with the discussion above.

As noted above, the system 300 may include two different types of memories 330A-B that are accessible to the CPU(s) or processor(s) 320. In an example, the memory 330A may be a non-persistent memory (e.g., RAM, cache, etc.) or any other type of memory device to which access by the CPU 320 is relatively faster than the memory 330B. In an example, the memory 330B may be a persistent memory (e.g., disk, data storage, server storage, flash drive, HDD, SDD, etc.) or any other type of memory device to which access by the CPU 320 is relatively slower than memory 330A.

As such, the supervisor 390 may be configured to delay write back (or write out of first data written by the WL 397A into the memory 330B, by temporarily storing the first data as first dirty memory in the memory space 332A allocated to the WL 397A. Additionally, the supervisor 390 may be configured to delay writing second data from the WL 397B to the memory 330B by temporarily storing the second data as second dirty memory in the memory space 332B allocated to the WL 397B.

In an example, the WL397A may be a first type of workload (e.g., a persistent container, etc.) and the WL 397B may be a second type of workload (e.g., a non-persistent container, build container, initialization container, etc.). In this example, the supervisor 390 may be configured to trigger writing at least a portion of the first dirty memory in the allocated memory space 332A of the WL 397A in response to the first dirty memory exceeding a threshold. For instance, in a scenario where the threshold is a dirty memory ratio (e.g., 20%), if a ratio of a current amount of the first dirty memory (e.g., 201 MB) relative to a total amount of the memory space 332A (e.g., 1 GB) exceeds the threshold dirty memory ratio, then the supervisor 390 may begin writing out at least a portion of the first dirty memory to from the memory space 332A to the memory 330B. Whereas, in this example, the supervisor 390 may be configured to continue delaying write out of the second dirty memory from the memory space 332B to the memory 330B in in response to the second dirty memory exceeding the same threshold (e.g., 20% of the total amount of memory space 332B).

Figure 4:
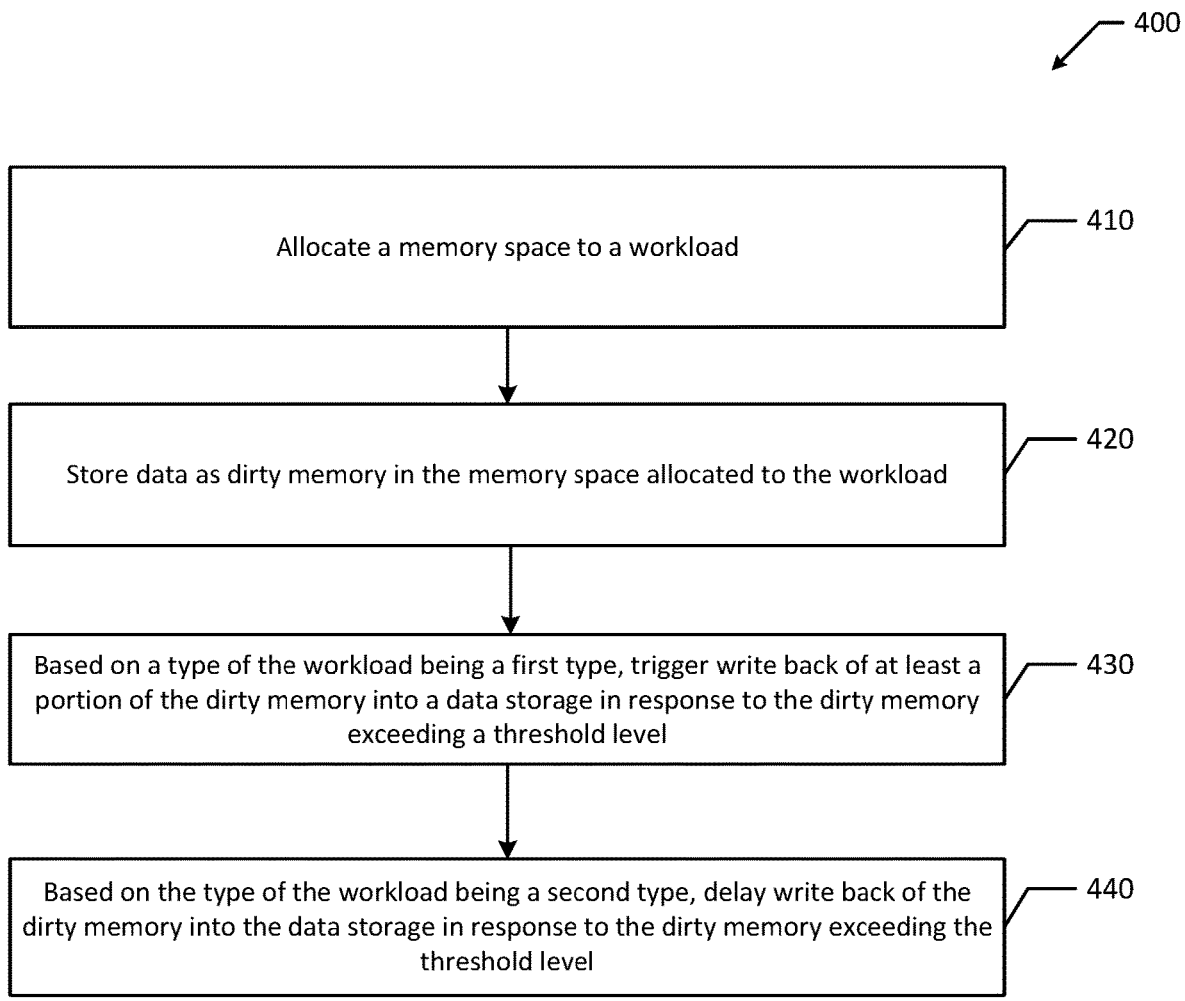
FIG. 4 illustrates a flowchart of an example process for monitoring and managing dirty memory usage, according to an example embodiment.

FIG. 4 is a flowchart of an example method 400 for memory management, in accordance with an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

At block 410, method 400 includes allocating a memory space to a workload. Referring back to FIG. 3 for example, the supervisor 390 may allocate a first memory space 332A in the memory 330A to a first workload 379A and may allocate a second memory space 332B in the memory 330A to a second workload 397B.

In some examples, the memory space allocated at block 410 may be included in a memory and the workload may be executing on a processor in communication with the memory. Referring back to FIG. 3 for example, the first and/or second workloads 397A-B may be executing on the one or more processors 320.

In some examples, method 400 also includes determining a type of the workload. Referring back to FIG. 1 for example, the workload at block 410 may be a container 170C, and the supervisor 190 may determine the type of the workload based on a configuration parameter assigned to the container 170C. The configuration parameter may be assigned to the container 170C by an administrator of the workload or by any entity that dispatches the container 170C or requests creating/deploying a new instance of the container 170C as the workload of block 410. Alternatively or additionally, the configuration parameter may be determined by the system 100 or the OS 186 or the supervisor 190 or the hypervisor 180 based on a format or other information associated with the container 170C. Alternatively or additionally, the supervisor 190 the type of the container may be indicated in any other configuration parameter or setting or metadata of the container 170C.

Accordingly, in some examples, method 400 also includes retrieving metadata associated with the workload, and determining a type of the workload based on the configuration parameter in the metadata. For example, in line with the discussion above, the metadata may store configuration parameters (e.g., number of CPUs requested, amount of memory to be allocated) or other settings selected by an administrator of the workload or other entity (e.g., a scheduler of the system 100, the supervisor 190, the OS 186, etc.) that dispatches the workload for execution on the computing system 100.

At block 420, method 400 includes storing data as dirty memory in the memory space allocated to the workload. Referring back to FIG. 2 for example, a supervisor (e.g., the supervisor 190 of FIG. 1) may temporarily store first data in the memory address 230C, which is allocated to a first workload (e.g., WL 'A'), as dirty memory by updating the status identifier 220C to indicate that memory address 230C is dirty memory. The first data may be data that was written by (or output from or received from or generated by or manipulated by) the first workload 'A'. As another example, the supervisor may temporarily store second data written by a second workload (e.g., WL 'B') in memory address 230E and indicate that the second data in memory address 230E is dirty memory by updating the status identifier 220E.

In some examples, method 400 includes, at block 420, storing the data as the dirty memory at least until the data is written back (or written out) to a data storage. Continuing with the example of FIG. 2, the supervisor 190 may prevent overwriting the dirty memory stored in memory address 230C (e.g., when choosing a memory page for storing additional new data, etc.) by write-protecting the memory address 230C, at least until the dirty memory in the memory address 230C is written back into a data storage (e.g., disk, memory 330B, etc.).

At block 430, method 400 includes triggering, based on a type of the workload being a first type, write back of at least a portion of the dirty memory into a data storage. Additionally, at block 440, method 400 includes delaying, based on the type of the workload being a second type, write back of the dirty memory into the data storage. In some examples, the triggering at block 430 and the delaying at block 440 may be in response to the dirty memory of the workload exceeding a threshold level. Referring back to FIG. 3 for example, the first WL 397A may be of the first type (e.g., persistent, regular, continuous, long term, etc.) and the second WL 397B may be of the second type (e.g., non-persistent, short term, initialization container, build container, etc.). In this example, in response to a first dirty memory (e.g., inside memory space 332A) of the first WL 397A exceeding a threshold level, the supervisor 390 (e.g., at block 430) may trigger writing at least a portion of the first dirty memory to the data storage 330B. Whereas, in response a second dirty memory (e.g., inside memory space 332B) of the second WL 397B exceeding that same threshold level, the supervisor 390 (at block 440) may instead continue to delay writing the second dirty memory.

In some examples, the memory is a RAM and the data storage is a disk (e.g., memory 330B). In these examples, the triggering at block 430 may involve moving at least a portion of the dirty memory from the RAM to the disk. Referring back to FIG. 3 for example, the supervisor 390 may move the dirty memory of the WL 397A-B from the RAM 330A to the disk 330B.

In some examples, the threshold level is a specific amount of maximum memory setting of an OS (e.g., OS 186) or a supervisor (e.g., supervisor 190) or a hypervisor (e.g., hypervisor 180). In other examples, the threshold level is a threshold ratio of an amount of the dirty memory of the workload relative to a total amount of the memory space allocated to the workload. Continuing with the example of FIG. 3, if a ratio of the first dirty memory of the first WL 397A relative to a total amount of the memory space 332A (allocated to the first WL 397A) exceeds the threshold ratio (e.g., 10%, 20%, or other given percentage), then the supervisor 390 may trigger the write back at block 430 (based on a type of the first WL 397A being the first type). Whereas, if the second dirty memory of the second WL 397B relative to the total amount of memory space 332B (allocated to the second WL 397B) exceeds that same threshold ratio, the supervisor 390 (at block 440) may instead continue to delay writing back the second dirty memory (based on a type of the second WL 397B being of the second type).

In some examples, the threshold level is a first threshold level that is less than a second threshold level.

In one example, method 400 may also include delaying, based on the workload being the first type, execution of at least one processor thread of the workload until at least a portion of the dirty memory of the workload is written back into the data storage in response to the dirty memory exceeding the second threshold level. In these examples, the method 400 may also include continuing execution of the processor thread of the workload in response to the dirty memory exceeding the second threshold level based on the type of the workload being the second type. Referring back to FIG. 3 for example, the first threshold level may be a soft limit (e.g., a 10% threshold dirty memory ratio) at which the supervisor 390 triggers write back of the dirty memory without preventing the workload 397A from continuing to write more dirty memory in the memory space 332A (based on the WL 397A being of the first type). Whereas, the second threshold level may be a hard limit (e.g., 20% threshold ratio) at which the supervisor 390 also prevents the WL 397A from executing processor threads that attempt to write additional dirty data to the memory space 332A (at least until the supervisor 390 moves a portion of existing dirty data out of the memory space 332A and into the data storage 330B). However, if the workload (e.g., WL 397B) is of the second type (e.g., non-persistent, etc.), then the supervisor would instead continue to allow execution of processor threads of WL 397B that attempt to write more dirty memory in the memory space 332B even if current dirty memory usage by the WL 397B exceeds that same second threshold level (e.g., 20%).

Alternatively, in another example, method 400 includes assigning the second threshold to the workload based on the type of the workload being the second type, and triggering the write back of the at least portion of the dirty memory of the workload to the data storage in response to the dirty memory of the workload exceeding the second threshold level and the type of the workload being the second type. Referring back to FIG. 3 for example, as noted above, the supervisor 390 may enforce the first threshold level (e.g., 10%) when triggering write back of the first dirty memory of the first WL 397A based on the first WL 397A being of the first type (e.g., persistent container, etc.) but continue to delay write back of the second dirty memory of the second WL 397B even if it exceeds the first threshold level (e.g., 10%). In this example, the supervisor 390 may instead trigger the write back of the second dirty memory of the WL 387B when it exceeds a second higher threshold level (e.g., 50%) which the supervisor 390 enforces on workloads of the second type (e.g., non-persistent) instead of enforcing the lower first threshold level (e.g., 10%).

Figure 5:
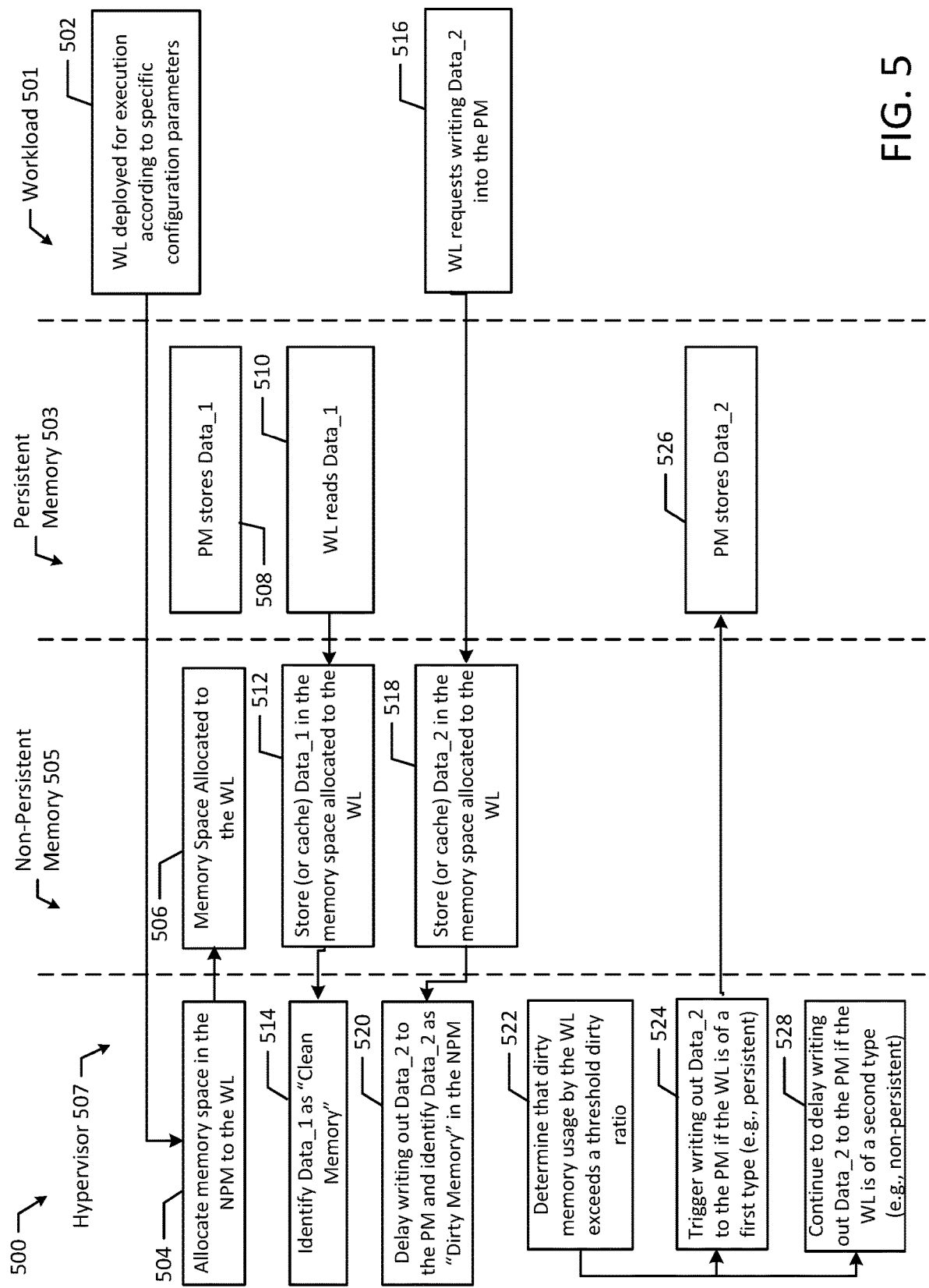
FIG. 5 illustrates a flow diagram of an example process for managing writeback overhead associated with a workload, according to an example embodiment.

FIG. 5 depicts a flow diagram illustrating an example method 500 for managing dirty memory usage, according to an example embodiment. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. The system 500 may include a workload (WL) 501, a persistent memory (PM) 503, a non-persistent memory (NPM) 505, and a hypervisor 507.

At block 502, the WL 501 is deployed for execution according to specific configuration parameters. For example, WL 501 may be dispatched for execution on processor(s) 320 of the system 300 or on a processor 120 of the system 100. In this example, an administrator of the WL 501 (or any other entity of the system 100) may provide the specific configuration parameters (e.g., requested number of CPUs, requested amount of memory, type of container, etc.) as metadata associated with the WL or container 501. The hypervisor 507 may then use these configuration parameters to deploy the WL 501 on a suitable node that has sufficient resources, etc., for allocation to the WL 501 according to the specific configuration parameters.

At block 504, the hypervisor 507 may allocate memory space in the non-persistent memory (NPM) 505 to the WL 501 based on the configuration parameters of the WL 501. For example, the hypervisor 507 may reserve a certain number of memory pages in NPM 505 (at block 506) for the WL 501 by updating a page memory table (e.g., table 200).

At block 508, the PM 503 (e.g., disk 330B, data storage, etc.) of the system 500 stores "Data_1." For example, Data_1 may be data such as files stored in a disk drive 503 or other persistent type of data storage 503.

At block 510, the WL 501 (while executing on the processor) requests reading Data_1 from the PM 503. In response, the system 500 may obtain Data_1 (from the PM 503) and then store or cache a copy of Data_1 into NPM 505 (at block 512).

At block 514, the hypervisor 507 identifies Data_1 as clean memory in the memory space allocated to the WL 501. For example, the hypervisor 507 may update a status identifier (e.g., 220B) of a memory page entry (e.g., 202B) in the NPM 505 where Data_1 is stored as clean memory.

At block 516, the WL 501 requests writing Data_2 into the PM 503. In an example, Data_2 may be an updated version of Data_1 or may be unrelated to Data_1. In response, at block 518, the hypervisor 507 may temporarily store or cache Data_2 in the memory space allocated to WL 501. Additionally, at block 520, the hypervisor 507 may delay writing out Data_2 to the PM and may identify Data_2 as dirty memory in the NPM. For example, the hypervisor 507 may update a memory page table (e.g., 200) to update a status identifier (e.g., 220C) of a memory page entry (e.g., 202C) of a memory address (e.g., 230C) in the NPM 505 where Data_2 is stored to identify that memory address as dirty memory.

At block 522, the hypervisor 507 determines that the dirty memory usage by the WL 501 exceeds a threshold dirty ratio. For example, as the WL 501 continues to run on the system 500, the hypervisor 507 may monitor a ratio of a current amount of dirty memory used by the WL 501 in the NPM 505 relative to a total amount of the memory space allocated to the WL 501. If the monitored ratio exceeds the threshold dirty ratio (e.g., 10%, etc.), then the hypervisor 507 decides whether it should trigger writing Data_2 to the PM 503 based on a type of the WL 501.

At block 524, if the type of the WL 501 (e.g., indicated by the specific configuration parameters of block 502) is a first type (e.g., persistent, etc.), then the hypervisor 507 triggers writing out Data_2 from the NPM 505 to the PM 503. Further, at block 526, the PM 503 stores the copy of Data_2 written out by the hypervisor 507 from the NPM 505 to the PM 503. The hypervisor 507 may then update the page table (e.g., 200) of the NPM 505 to identify the memory page(s) in the NPM 505 where Data_2 is stored as clean memory instead of dirty memory.

However, at block 528, if the type of the WL 501 is instead the second type (e.g., non-persistent container, build container, initialization container, etc.), then the hypervisor 507 continues to delay writing out Data_2 to the PM 503 even though dirty memory usage by the WL 501 exceeded the threshold dirty ratio. In some examples, if the system 500 or the WL 501 crashes before Data_2 is written out to the PM 503, then the hypervisor 507 may simply discard the versions of Data_1 and Data_2 that were saved on the NPM 505 and just relaunch another instance of the WL 501.

Figure 6:
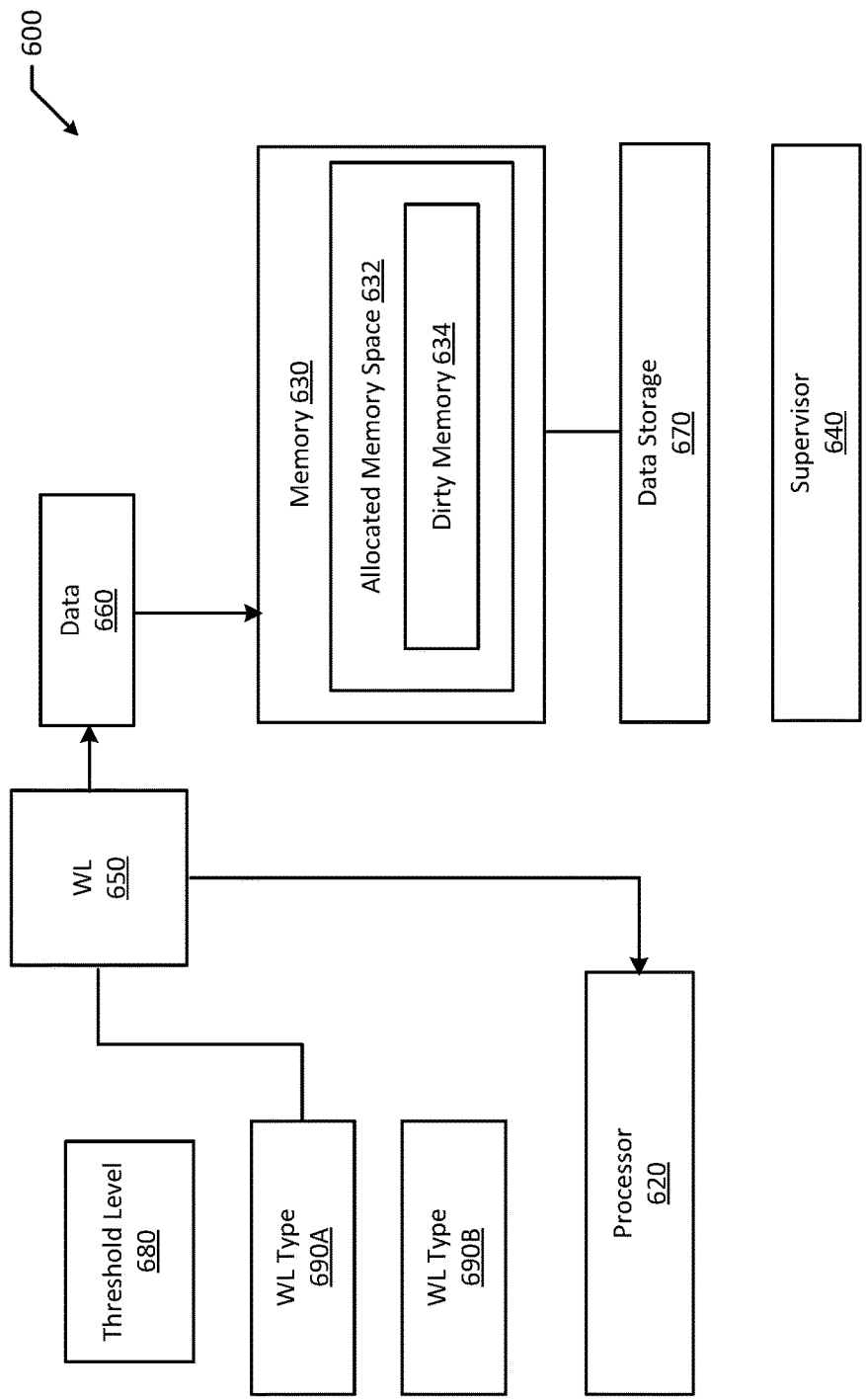
FIG. 6 illustrates a block diagram of an example memory management system, according to an example embodiment of the present disclosure.

FIG. 6 is a block diagram of an example system 600, according to an example embodiment of the present disclosure. The system 600 includes a memory 630, a processor 620 in communication with the memory 630, and a supervisor 640. The supervisor 640 allocates a memory space 632 to a workload 650 executing on the processor 620. The supervisor 640 stores data 660 written by the WL 650 as dirty memory 634 in the memory space 632 at least until the data 660 is written back to a data storage 670. Based on a type of the WL 650 being a first type 690A, the supervisor 640 triggers write back of at least a portion of the dirty memory 634 into the data storage 670 in response to the dirty memory 634 exceeding a threshold level 680. Based on the type of the WL 650 being a second type 690B, the supervisor 640 delays write back of the dirty memory 634 into the data storage 670 in response to the dirty memory 634 exceeding the threshold level 680.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
a memory;
a processor in communication with the memory; and
a supervisor, wherein the supervisor is configured to:
  allocate a memory space in the memory to a workload executing on the processor;
  store, as dirty memory in the memory space allocated to the workload, data written by the workload at least until the data is written back into a data storage;
  based on a type of the workload being a first type, trigger write back of at least a portion of the dirty memory into the data storage in response to the dirty memory exceeding a first threshold level; and
  based on the type of the workload being a second type,
    delay write back of the dirty memory into the data storage in response to the dirty memory exceeding the first threshold level, and
    continue execution of at least one thread of the workload on the processor in response to the dirty memory exceeding a second threshold level greater than the first threshold level,
  wherein the workload of the first type is more sensitive to data loss and data consistency risks than the workload of the second type.

2. The system of claim 1, wherein the first and second threshold levels are threshold ratios of amounts of the dirty memory of the workload relative to a total amount of the memory space allocated to the workload.

3. The system of claim 1, further comprising:
a node, wherein the processor and the memory are disposed in the node, wherein the workload includes a container deployed at the node, and wherein the type of the workload is based on a configuration parameter assigned to the container prior to deployment of the container at the node.

4. The system of claim 1, wherein the supervisor is configured to:
retrieve metadata associated with the workload, wherein the metadata includes a configuration parameter selected for the workload prior to dispatch of the workload for execution on the processor; and
determine the type of the workload based on the configuration parameter in the metadata.

5. The system of claim 1, wherein the memory is a random access memory (RAM).

6. The system of claim 5, wherein the data storage is a disk, and wherein triggering the write back causes the supervisor to move at least a portion of the data from the RAM to the disk.

7. The system of claim 1, wherein the supervisor is a hypervisor.

8. The system of claim 1, wherein the supervisor is configured to:
based on the type of the workload being the first type, delay execution of the at least one thread of the workload on the processor until the at least portion of the dirty memory is written back into the data storage in response to the dirty memory exceeding the second threshold level.

9. The system of claim 1, wherein the supervisor is configured to:
assign, to the workload, a third threshold level greater than the first threshold level based on the type of the workload being the second type; and
in response to the dirty memory of the workload exceeding the third threshold level and the type of the workload being the second type, trigger the write back of the at least portion of the dirty memory of the workload into the data storage.

10. A method comprising:
allocating memory space in a memory to a workload executing on a processor, wherein the processor is in communication with the memory;
storing, as dirty memory in the memory space allocated to the workload, data processed by the workload at least until the data is written back to a data storage;
based on a type of the workload being a first type, writing out at least a portion of the dirty memory to the data storage in response to the dirty memory exceeding a first threshold level; and
based on the type of the workload being a second type,
  delaying write out of the dirty memory to the data storage in response to the dirty memory exceeding the first threshold level, and
  continue execution of at least one thread of the workload on the processor in response to the dirty memory exceeding a second threshold level greater than the first threshold level,
wherein the workload of the first type is more sensitive to data loss and data consistency risks than the workload of the second type.

11. The method of claim 10, wherein the first and second threshold levels are threshold ratios of amounts of the dirty memory of the workload relative to a total amount of the memory space allocated to the workload.

12. The method of claim 10, further comprising:
retrieving metadata associated with the workload, wherein the metadata includes a configuration parameter assigned to the workload; and
determining the type of the workload based on the configuration parameter in the metadata.

13. The method of claim 10, wherein the memory is a random access memory (RAM).

14. The method of claim 13, wherein the data storage is a disk, and wherein writing out the at least portion of the dirty memory includes transferring at least a portion of the data from the RAM to the disk.

15. The method of claim 10, further comprising:
based on the type of the workload being the first type, delaying execution of the at least one thread of the workload in response to the dirty memory exceeding the second threshold level.

16. The method of claim 15, wherein delaying the execution of the at least one thread of the workload includes delaying the execution until completion of the writing back of the at least portion of the dirty memory to the data storage.

17. The method of claim 10, the method further comprising:
assigning, to the workload, a third threshold level greater than the first threshold level based on the type of the workload being the second type; and
in response to the dirty memory of the workload exceeding the third threshold level and the type of the workload being the second type, writing back the at least portion of the dirty memory of the workload to the data storage.

18. A non-transitory machine-readable medium storing instructions that, when executed by at least one processor of a computer system, cause the computer system to:
  allocate memory space in a memory to a workload executing on a processor, wherein the processor is in communication with the memory;
  store, as dirty memory pages in the memory space allocated to the workload, data from the workload at least until the data is written out to a data storage;
  based on a type of the workload being a first type, write at least a portion of the dirty memory pages to the data storage in response to the dirty memory pages exceeding a first threshold level; and
  based on the type of the workload being a second type,
    delay writing the dirty memory pages to the data storage in response to the dirty memory pages exceeding the first threshold level, and
    continue execution of at least one thread of the workload on the processor in response to the dirty memory exceeding a second threshold level greater than the first threshold level,
  wherein the workload of the first type is more sensitive to data loss and data consistency risks than the workload of the second type.

* * * * *